Jan. 14, 1964

G. C. BARTON 3,117,347

PLASTIC INJECTION MOLDING MACHINES

Filed June 9, 1961

Inventor
George C. Barton
By his Attorney

Jan. 14, 1964 G. C. BARTON 3,117,347
PLASTIC INJECTION MOLDING MACHINES
Filed June 9, 1961 8 Sheets-Sheet 2
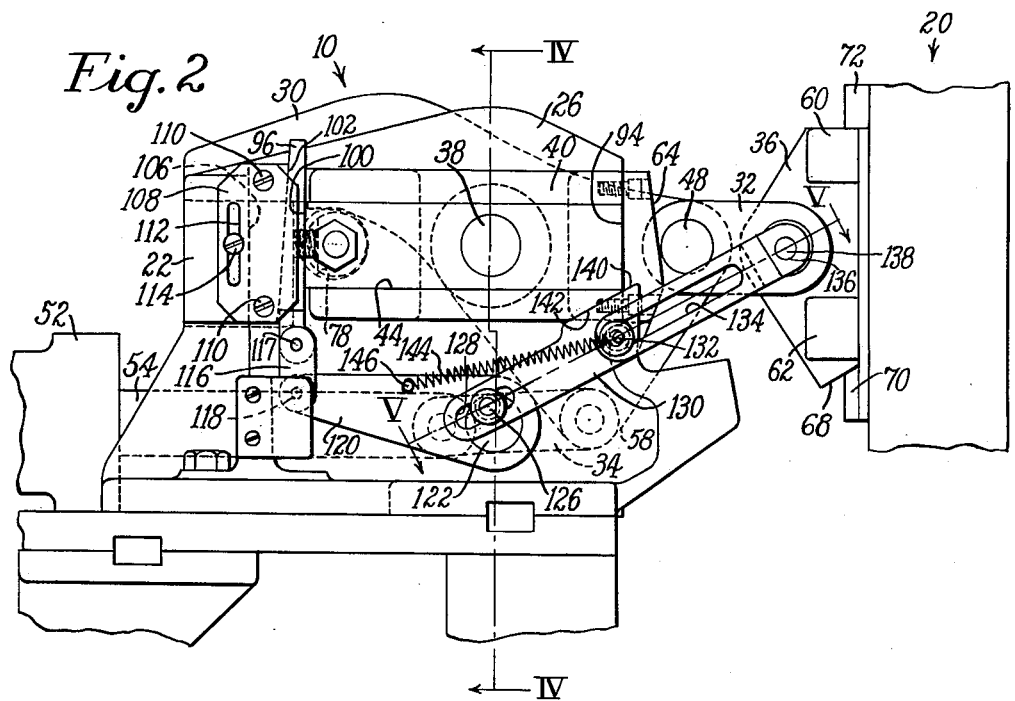
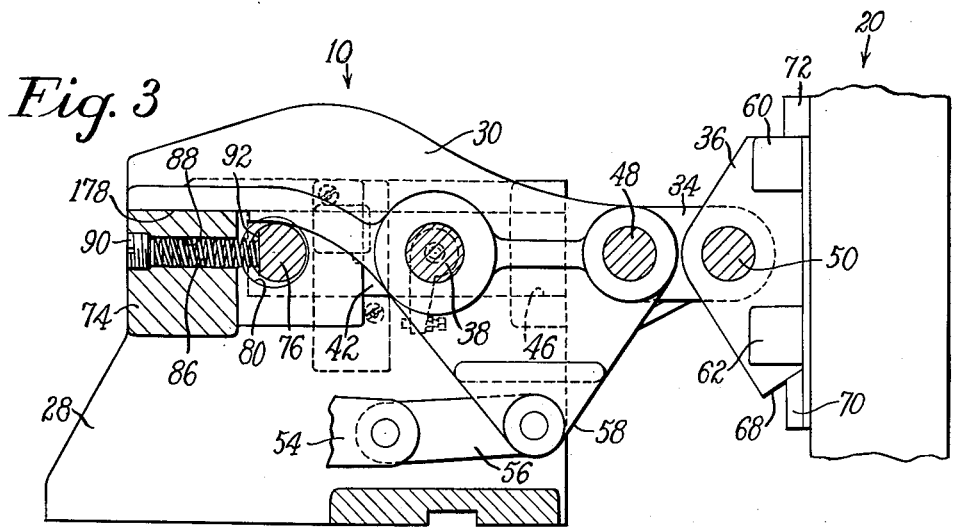

Jan. 14, 1964 G. C. BARTON 3,117,347
PLASTIC INJECTION MOLDING MACHINES
Filed June 9, 1961 8 Sheets-Sheet 3
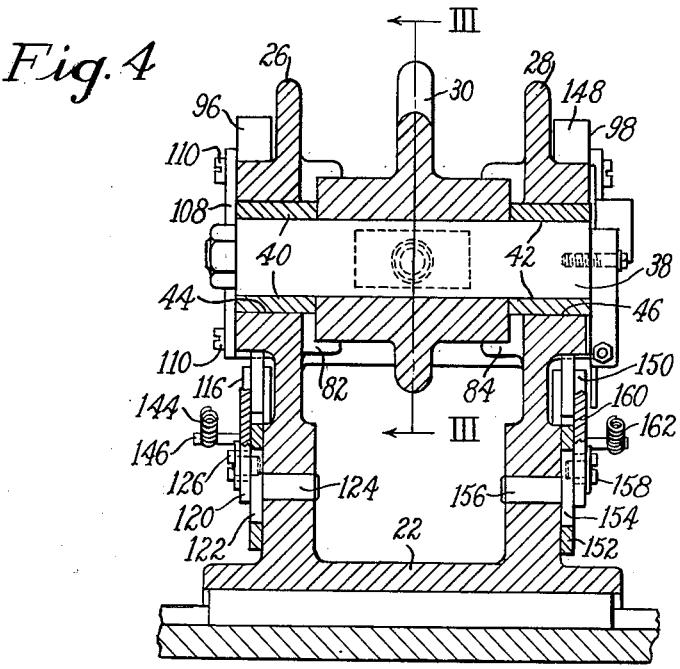
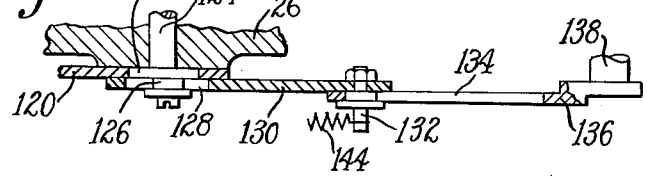

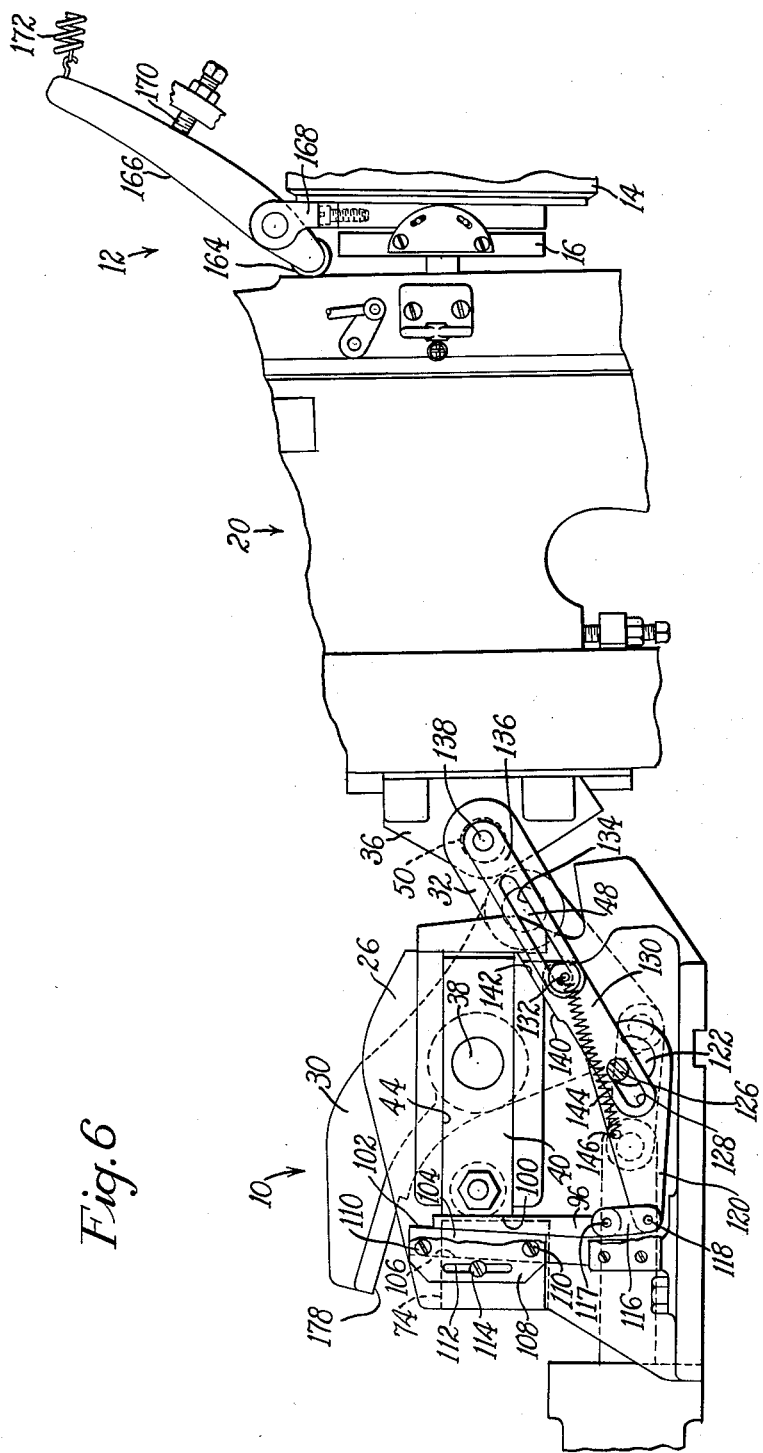

Jan. 14, 1964  G. C. BARTON  3,117,347
PLASTIC INJECTION MOLDING MACHINES
Filed June 9, 1961  8 Sheets-Sheet 6

Jan. 14, 1964 G. C. BARTON 3,117,347
PLASTIC INJECTION MOLDING MACHINES
Filed June 9, 1961 8 Sheets-Sheet 7

Jan. 14, 1964 G. C. BARTON 3,117,347
PLASTIC INJECTION MOLDING MACHINES
Filed June 9, 1961 8 Sheets-Sheet 8

United States Patent Office 3,117,347
Patented Jan. 14, 1964

3,117,347
PLASTIC INJECTION MOLDING MACHINES
George Clifford Barton, Leicester, England, assignor to United Shoe Machinery Corporation, Flemington, N.J., a corporation of New Jersey
Filed June 9, 1961, Ser. No. 116,012
Claims priority, application Great Britain June 18, 1960
2 Claims. (Cl. 18—30)

This invention relates to plastic injection molding machines and is herein illustrated in its application to machines for molding soles onto shoe bottoms. Such a machine is illustrated, for example, in an application for United States Letters Patent Serial No. 875,389, filed December 4, 1959, in my name now Patent No. 3,055,056. Machines of the type disclosed in said application are provided with a suitable mold charging means and a turret for advancing a plurality of mold members successively into the mold charging station. At the mold charging station suitable means is provided for bringing the mold assembly into registration with the injection nozzle. The mold charging means includes a cylinder in which shoe soling material is plasticized and heated to a fluid condition, said cylinder having a suitable injection nozzle at its downstream end. The horizontal position of the nozzle varies appreciably with the expansion and contraction of the cylinder and it has been found necessary to incorporate in the mold registering means suitable means for compensating for such variations in the position of the injection nozzle in order to insure a suitable mating engagement between the nozzle and the mold assembly.

To this end the present invention contemplates the provision in a machine of the type above referred to of a means for bringing the mold assembly into registration with the injection nozzle, said means including a toggle comprising a first link which carries a thrust member and a second link which receives retrograde movement in the course of the toggle straightening operation, said retrograde movement being automatically varied to compensate for variations in the position of the injection nozzle caused by expansion and contraction of the cylinder and contraction and expansion of the mold assembly itself. The retrograde movement is arrested by an adjustable stop member and an actuator is provided for straightening the toggle links and for adjusting the stop member to compensate for variations in the position of the injection nozzle. The second link is mounted on a carrier which is yieldingly held against retrograde movement while the mold assembly is being advanced into mold charging position. The retrograde movement of the carrier occurs immediately after the completion of the advancement of the mold assembly into its mold charging position, such retrograde movement being positively terminated concomitantly with the completion of the straightening of the toggle so that the toggle positively holds the mold assembly in mating engagement with the injection nozzle during the mold charging operation. The toggle assembly operates in three stages: a first stage which advances the thrust member to a variable extent thereby to translate the mold assembly in the mold charging station from a retracted or ambulatory position in which it is located during the rotation of the turret to an intermediate position in which it is located in determinate relation to the injection nozzle, a second stage in which the second link receives its variable retrograde movement and a third stage which advances the thrust member to a constant extent thereby to translate the mold assembly from its intermediate position to its mold charging position. The extent of the first stage of the toggle operation is determined by the engagement of the mold assembly with an arresting means carried by the injection cylinder. The retrograde movement of the second toggle link during the second stage of the toggle operation is terminated by an adjustable stop member which positively arrests the carrier on which the second link is mounted, said stop member being so located that the third stage in the operation of the toggle links completes the straightening thereof and brings the mold assembly into its mold charging position. In the illustrated organization the stop member is adjusted by the toggle actuator during the first stage of the toggle operation. Such adjustment compensates for variations in the position of the injection nozzle caused by expansion and contraction of the mold cylinder, and compensates further for possible expansion and contraction of the mold assembly itself. In order to provide a setting up adjustment for the stop member, it is located against an abutment member which is adjustable to vary the position of the stop member in the direction of the toggle straightening movement.

The invention will now be described with reference to the accompanying drawings and pointed out in the appended claims.

In the drawings:

FIG. 2 is a side elevation similar to FIG. 1 showing the mold assembly in its mold charging position;

FIG. 3 is a side elevation similar to FIG. 2 partly in section on the line III—III of FIG. 4;

FIG. 4 is a section taken on the line IV—IV of FIG. 2;

FIG. 5 is a section taken on the line V—V of FIG. 2;

FIG. 6 is a side elevation similar to FIG. 1 showing the mold assembly in an intermediate position between its retracted position and its mold charging position;

Figure 11:
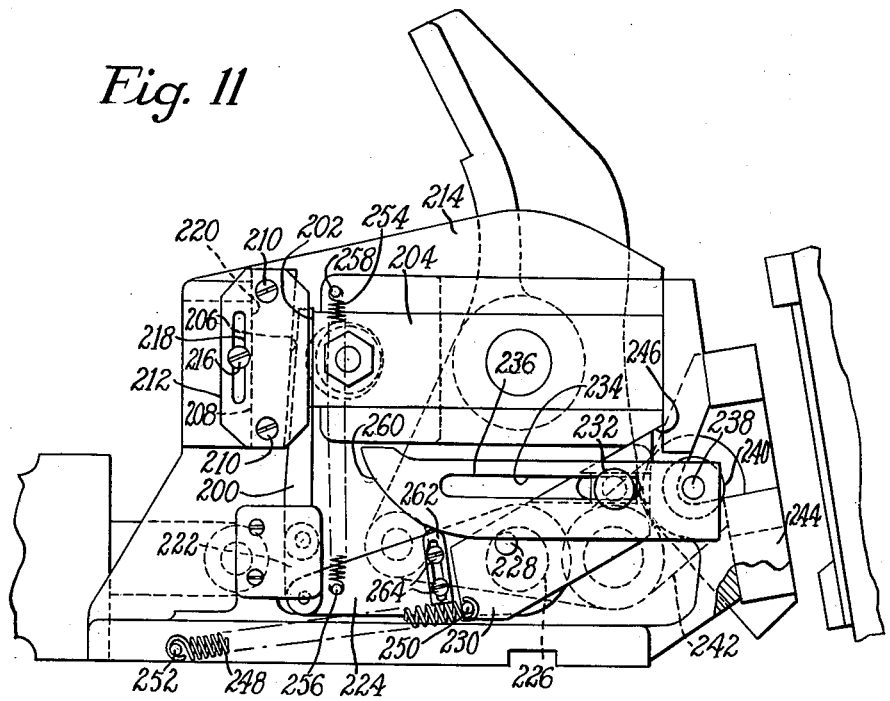
Figure 12:
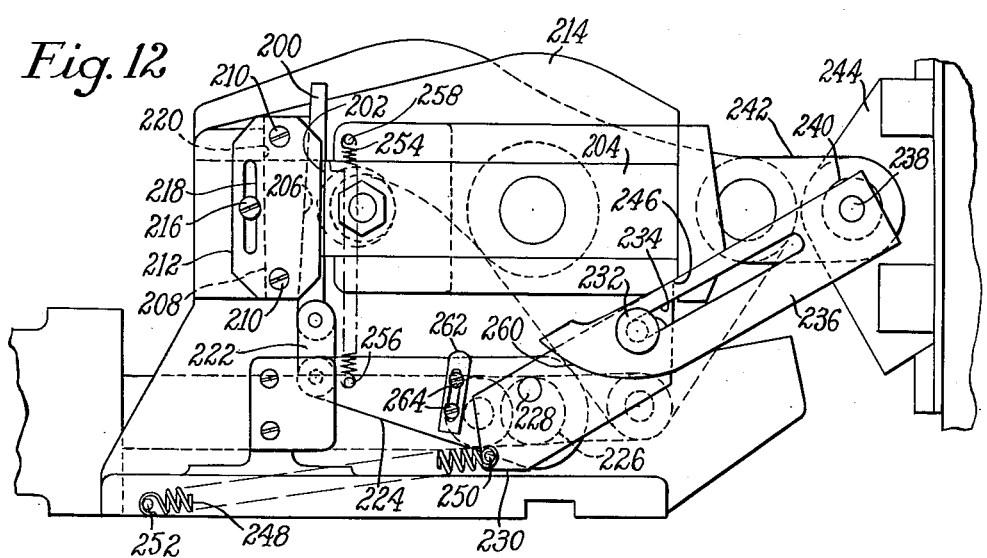
Figure 13:
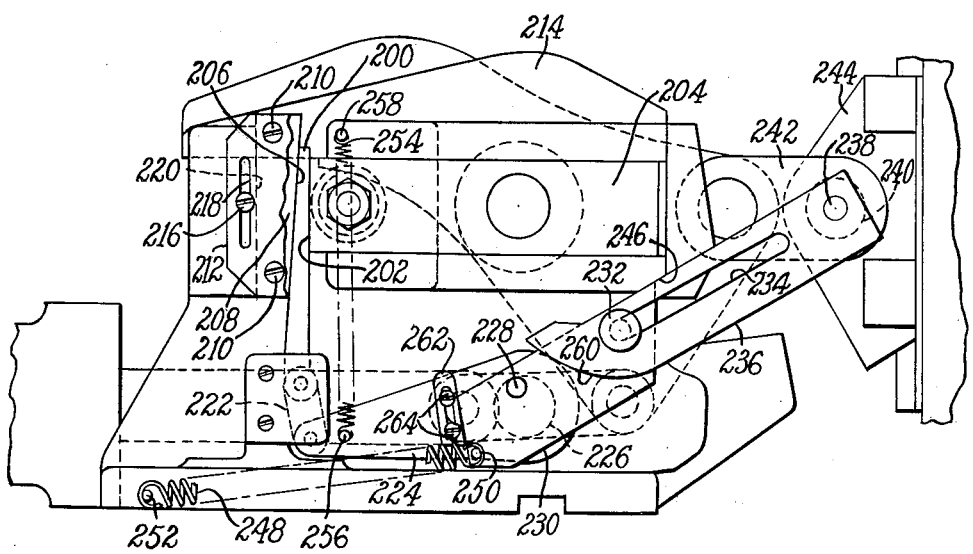
Figure 14:
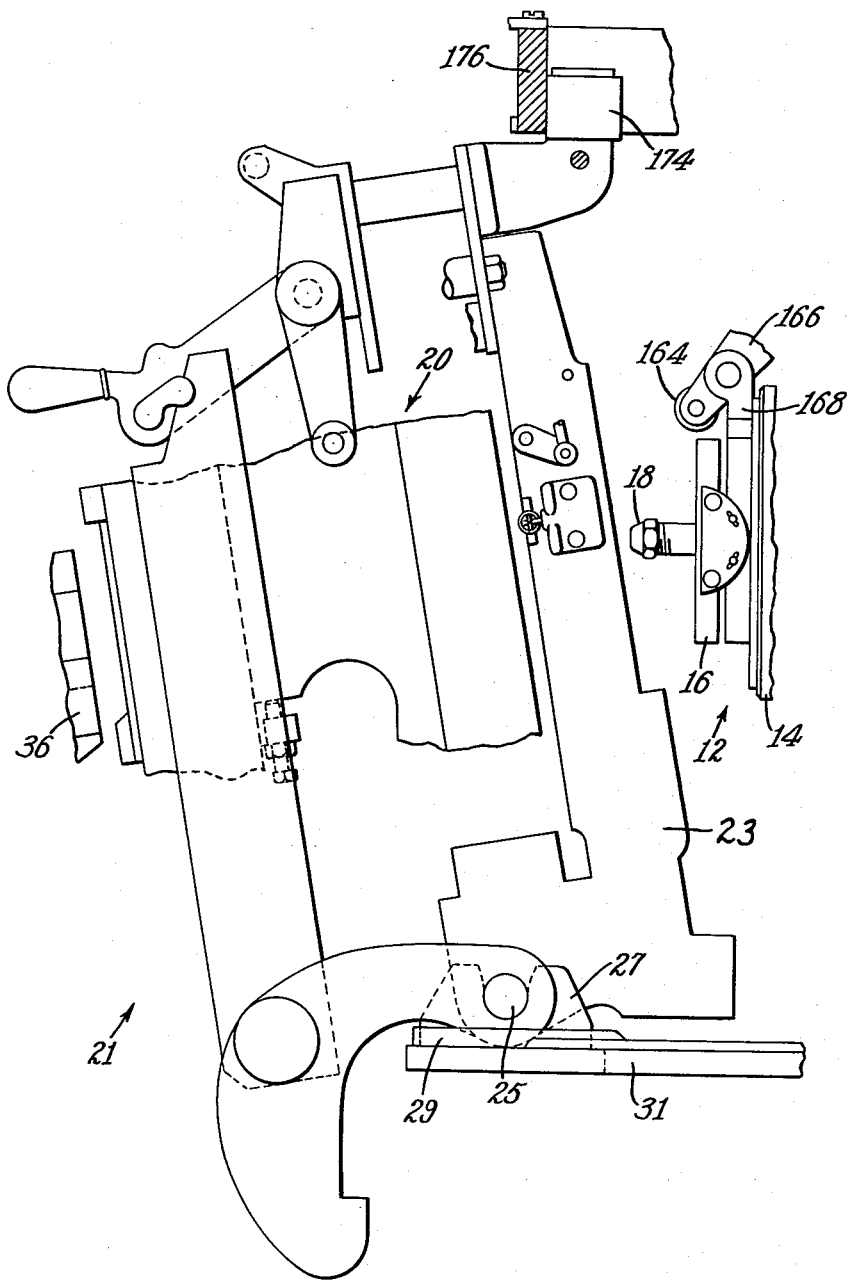

FIGS. 11, 12 and 13 are side elevations illustrating a modified construction of the toggle linkage, the linkage being shown in FIG. 11 in its rest position, in FIG. 12 in its extended position with the injection cylinder and the mold assembly cold, and in FIG. 13 in its extended position with the injection cylinder and the mold assembly hot; and FIG. 14 is a side elevation illustrating the general features of an ambulatory assembly in its retracted position in the mold charging station.

The invention is illustrated in the drawings as embodied in a machine of the type illustrated, for example, in the Barton application hereinbefore referred to. The invention is embodied in an organization, identified generally in FIG. 1 by the numeral 10, whereby a mold assembly is advanced from a retracted or open position illustrated in FIG. 1 into a mold charging or closed position illustrated in FIG. 2.

Figure 1:
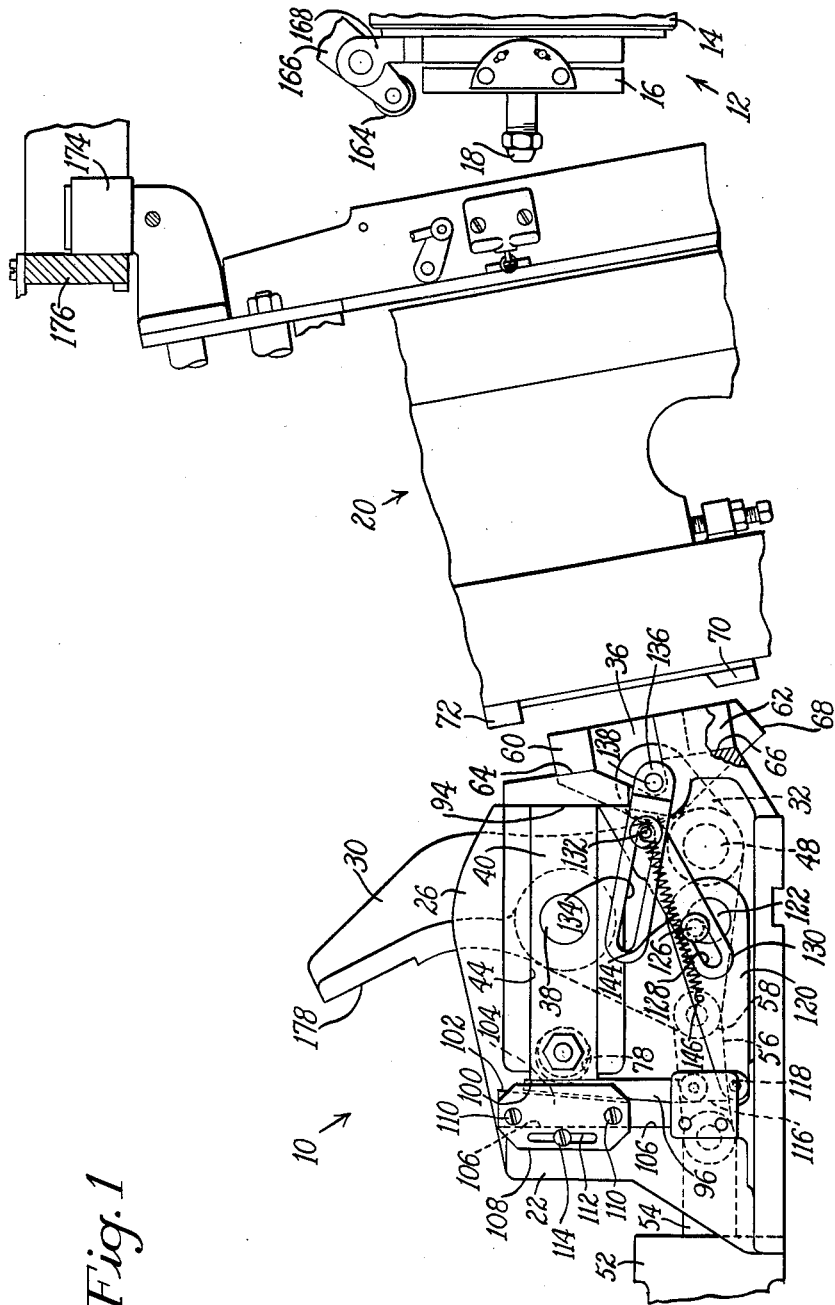
FIG. 1 is a side elevation illustrating a portion of a plastic injection molding machine embodying the features of the present invention, the molding assembly being shown retracted from the injection nozzle.

The illustrated machine is provided with a mold charging means, a portion of which is illustrated in FIG. 1 and identified generally by the numeral 12. The illustrated mold charging organization comprises a horizontal cylinder 14 having at one end thereof an injection head 16 from which projects a nozzle 18. Fluid plastic, under relatively low pressure, is injected through the nozzle 18 into a plurality of mold assemblies presented successively thereto. The mold assemblies are mounted on a horizontal annular turret (not shown) mounted for rotation about a vertical axis, one of the assemblies being illustrated in FIG. 1 and identified by the numeral 20. The turret is operated by a mechanism not illustrated in the drawings to index each mold assembly in turn to and from the mold charging station. Referring to FIG. 14, the mold assembly is carried by an ambulatory assembly 21 having incorporated therein a frame member 23 which carries at its lower extremity a cross shaft 25 which is received in trunnions, one of which is illustrated in FIG. 14 and identified by the numeral 27. The trunnions are secured in upstanding relation to a plate 29 fixed to an annular turret member 31. The ambulatory assembly is illustrated in FIG. 14 in its retracted position in the mold charging station. The ambulatory assembly is swung in a clockwise direction from its position in FIG. 14 upon the trunnions 27 into mold charging relation to the injection nozzle 18 by the operation of the organization 10 as hereinafter described.

The organization 10 comprises a toggle mechanism which is straightened to cause a thrust member to advance the mold assembly 20 into its mold charging position and to hold it in that position during the mold charging operation. The toggle assembly is automatically adjusted longitudinally thereof by a compensating mechanism hereinafter described which causes the mold assembly to be brought into proper registration with the nozzle 18 regardless of changes in dimension of the mold assembly and the injection assembly caused by expansion under the influence of the heat applied to the mold and the injection cylinder.

Referring to FIG. 1, the organization 10 comprises a casting 22 which is secured to the machine frame at the mold charging station of the machine. As shown in FIG. 4, the casting comprises two upstanding side members 26 and 28 between which the toggle mechanism is mounted. As shown in FIG. 1, the toggle mechanism comprises a link 30 having pivoted thereto a pair of links 32 and 34 which in turn are pivotally connected to a thrust block 36 which is positioned relatively to the injection head 16 to provide space for the advancement of the mold assembly 20 into the mold charging station during the indexing movement of the turret. The toggle link 30 is fixed to a shaft 38 which is journaled in two slides 40 and 42 mounted in slideways 44 and 46 formed in the side members 26 and 28, respectively. The links 32 and 34 are pivotally connected to the link 30 by a cross shaft 48 and to the thrust block 36 by a cross shaft 50 (FIG. 3). For straightening the toggle a piston (not shown) is mounted in a cylinder 52 secured to the machine frame. A piston rod 54 projecting from the cylinder is connected by a link 56 to an offset apex 58 of a triangular structure incorporated in the toggle link 30. When the toggle is broken, as shown in FIG. 1, the thrust block 36 is located by the engagement of its two lateral extensions 60 and 62 with plane end faces 64 and 66 of the side member 26. When the toggle is straightened, as shown in FIGS. 2 and 3, the thrust block is located relatively to the mold assembly 20 by the engagement of an angular bottom face 68 of the thrust block with a complementally shaped upper surface of an extension 70 of the mold assembly and by the engagement of the upper surface of the thrust block with the bottom surface of an extension 72 of the mold assembly. The straightened position of the toggle links is determined by the engagement of an extension of the link 30 with a crosshead 74 connecting the side members 26 and 28. The slides 40 and 42 which mount the toggle link 30 are connected together by a cross shaft 76, the opposite end portions of which extend through oversize bores 78 and 80 formed respectively in bosses 82 and 84 (FIG. 4) projecting inwardly from the side members 26 and 28, respectively. The slides 40 and 42 are resiliently urged to the right as seen in FIG. 3 by a spring 86 mounted in a bore 88 formed in the crosshead 74, said spring being confined between a screw plug 90 in a threaded end portion of the bore 88 and a slabbed-off surface 92 of the cross shaft 76. Movement of the slide 40 to the right as seen in FIG. 2 by the expansion of the spring 86 is limited by a shoulder 94 at the right end portion of the casting 22, and a like shoulder (not shown) limits the movement of the slide 42.

The compensating means for adjusting the longitudinal position of the toggle mechanism comprises two locating members herein illustrated as wedges 96 and 98 constructed and arranged to operate on the slides 40 and 42, respectively. Referring to FIG. 6, the wedge 96 is positioned between a vertical end face 100 of the slide 40 and the angular face 102 of an abutment member 104. The abutment member is mounted in a rabbet formed in the side member 26, the vertical edge face of the abutment member being arranged in sliding engagement with the wall 106 of the rabbet. A plate 108 is secured to the abutment member 104 by screws 110 and the plate is provided with a vertical slot 112 through which extends a headed screw 114 whereby the abutment member is clamped in adjusted position to the side member 26. In the illustrated organization the wedge is advanced into its operating position by the straightening of the toggle links and retracted into its inoperative position illustrated in FIG. 1 by the breaking of the toggle.

To this end, a link 116 is pivoted at 117 to the wedge 96 and at 118 to the free end of an arm 120 secured to a disc 122. The disc is secured to a short shaft 124 (FIG. 4) rotatably mounted in the side member 26. Eccentrically mounted in the disc 122 is a pin 126 (FIG. 1) which extends outwardly from the disc through a slot 128 formed in a link 130. At its right end the link 130 carries a pin 132 which extends through a slot 134 extending longitudinally of a link 136, the right end portion of which is pivoted on a reduced extension 138 of the cross shaft 50. The movements of the link 130 are directed in a rectilinear path by the engagement of a plane surface 140 (FIG. 2) formed in the upper portion of the link with an angular surface 142 formed in the side member 26. For urging the link 130 to the left as seen in FIG. 1, a spring 144 is anchored at one end to a pin 146 mounted in the arm 120 and at the other end to an extension of the pin 132. The wedge 98 (FIG. 4) is arranged similarly to the wedge 96, having a face 148 which engages a vertical surface of the slide 42 and an inclined face which registers with a parallel surface of a bearing member (not shown) similar to the bearing member 104 illustrated in FIG. 6. The wedge 98 is pivoted to a link 150 corresponding to the link 116, said link 150 being pivoted to an arm 152 fixed to a disc 154 having a shaft 156 rotatably mounted in the side member 28. A pin 158 fixed in the disc rides in the slot in a link 160 corresponding to the link 130 illustrated in FIG. 6. A spring 162 corresponding to the spring 144 urges the link 160 forwardly as seen in FIG. 4.

In the operation of the illustrated machine the mold assembly 20 advances into the mold charging station in its angular position illustrated in FIG. 1 with the right side portion of the mold assembly spaced from the injection nozzle 18. At this time the toggle is broken and the slide 40 is held in abutting relation to the shoulder 94 by the spring 86. With the toggle mechanism in this position the wedges 96 and 98 are in their lowermost or retracted position illustrated in FIG. 1. With the toggle mechanism retracted, the link 130 is urged to the left as seen in FIG. 1 by the spring 144 into a position determined by the engagement of the right end wall of the slot 128 with the pin 126. The spring 144 also serves to hold the plane surface 140 (FIG. 2) of the link 130 against the angular surface 142 of the side member 26. For advancing the mold assembly 20 into its mold charging position the cylinder 52 is pressurized, moving the piston rod 54 to the right, thus initiating the straightening of the toggle links and advancing the thrust block 36 into engagement with the mold assembly. The spring 86 holds the slide 40 against the shoulder 94 during the initial straightening of the toggle links. The link 136 advances with the thrust block 36 bringing the left end wall of the slot 134 into contact with the pin 132. Further movement of the thrust block thereafter rotates the disc 122 in a clockwise direction as seen in FIG. 1, the spring 144 holding the right end wall of the slot 128 against the pin 126. The rotation of the disc swings the arm 120 upwardly to elevate the wedge 96. The advancement of the mold assembly 20 into its mold charging position is resisted by a roll 164 mounted at the lower end of a lever 166 fulcrumed on a bracket 168 fixed to the head 16 of the injection assembly. The lever is urged in a clockwise direction as seen in FIG. 6 against a stop 170 by a spring 172 anchored to the upper portion of the lever. When the mold assembly 20 engages the roll 164 the advancement of the mold assembly is temporarily arrested since the force required to move the mold assembly against the action of the spring 172 is greater than the force required to move the slide 40 to the left against the action of the spring 86 (FIG. 3). Consequently, continued operation of the piston rod 54 after the mold assembly engages the roll 164 causes the slide 40 and its companion slide 42 to move to the left against the pressure of the spring 86 until the left end faces of the slides engage the wedges 96 and 98, thus positively arresting the retrograde movement of the slides. Continued movement of the piston rod 54 thereafter completes the straightening of the toggle links and brings the mold assembly 20 into its injection position. During this phase of the operation of the toggle mechanism the link 130 moves to the right relatively to the pin 126 into a position such, for example, as that illustrated in FIG. 2.

In the rest position of the machine the mold assembly 20 is in its position illustrated in FIG. 1, this position of the mold assembly being determined by the engagement of a roll 174 at the upper extremity of the mold assembly with the inner or convex surface of an endless circular rail 176 secured to the machine frame. At this time the toggle is broken and the thrust block 36 is in its fully retracted position affording clearance for the advancement of the mold assembly into the mold charging station, the slide 40 being in contact with the shoulder 94, as shown in FIG. 1, and the wedges 96 and 98 being at the limit of their downward movement.

In the following description of the operation of the machine it will be understood that reference to the wedge 96 and its operating mechanism applies equally well to the wedge 98 and its operating mechanism since the two wedges operate in unison.

When the toggle is broken as shown in FIG. 1 the link 130 is urged to the left by the spring 144 so that the right end wall of the slot 128 engages the pin 126 and the surface 140 of the link bears against the surface 142 of the side member 26. The advancement of the mold assembly 20 into the mold charging station causes the cylinder 52 to be pressurized thereby to advance the piston therein to the right as seen in FIG. 1 and to operate the piston rod 54 and the link 56 to straighten the toggle links and thus to advance the thrust block 36 into engagement with the mold assembly. During this stage of the operation of the toggle the slide 40 is held against the shoulder 94 by the spring 86. As the thrust block advances the link 136 moves with it, the slot 134 in the link moving relatively to the pin 132. When the left end wall of the slot contacts the pin the link 136 carries the link 130 with it, thus tensioning the spring 144, and the tension of the spring holds the pin 126 against the right end wall of the slot 128, thus causing the arm 120 to swing in a clockwise direction, thereby moving the wedge 96 upwardly between the left end face 100 of the slide 40 and the abutment member 104. The first stage of the operation of the toggle continues until the mold assembly engages the roll 164 (FIG. 6). During the second stage of the operation of the toggle the slide 40 moves to the left until it engages the wedge 96 and continued movement of the slide thereafter moves the wedge to the left against the abutment member 104. The retrograde operation of the toggle during its second stage of operation is caused by the differential between the springs 172 and 86, the former being substantially stronger than the latter. During the third and final stage of the operation of the toggle the straightening of the toggle links is completed, the straightened position being determined by the engagement of an undercut surface 178 of the toggle link 30 with the arm 74. During this stage of the operation of the toggle the wedge 96 remains stationary and the mold assembly is advanced into mating engagement with the nozzle 18.

In the operation of the mold presenting means 10 when the machine is cold the wedge 96 is moved upwardly into a position such, for example, as that illustrated in FIG. 2 before the mold assembly engages the roll 164. After the machine becomes hot the roll 164 is engaged by the mold assembly at an earlier stage in the operation of the toggle mechanism and the wedge is advanced into a position such, for example, as that illustrated in FIG. 6. Thus, the mold presenting means 10 advances the mold assembly into mating engagement with the nozzle 18 irrespective of small variations in the position of the nozzle 18 caused by the application of heat to the cylinder 14.

Figure 7:
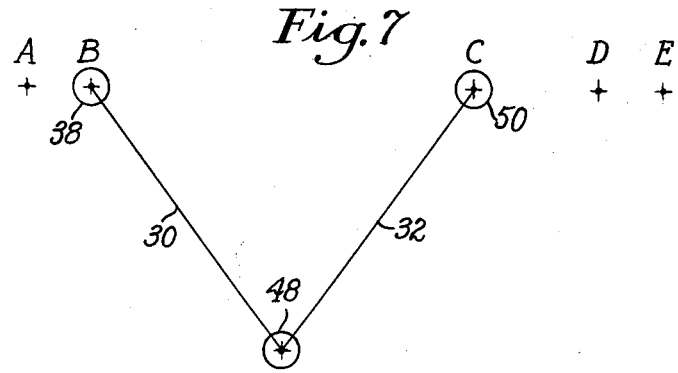
FIGS. 7 to 10 are diagrammatic views illustrating the operation of the toggle elements.
Figure 8:
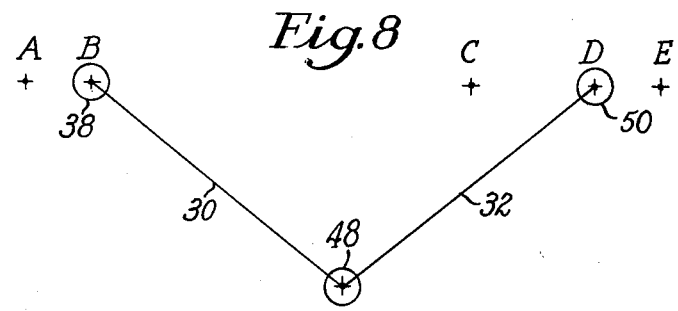
Figure 9:
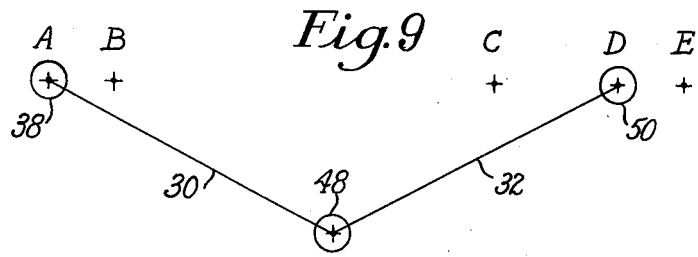
Figure 10:
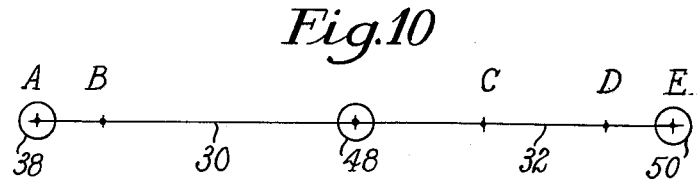

FIGS. 7 and 10 illustrate diagrammatically the three stages of the straightening movement of the toggle links. FIG. 7 shows the toggle links in their fully retracted or broken position illustrated in FIG. 1, and FIGS. 8, 9, and 10 illustrate the positions of the links at the completion of each of the three stages of the toggle operation. During the first stage of the toggle straightening movement the shaft 50 moves from C to D and the thrust member 36 advances the mold assembly 20 from its position in FIG. 1 to its position illustrated in FIG. 6. Further movement of the mold assembly in this direction is obstructed by the roll 164, the spring 172 being stronger than the spring 86 (FIG. 3). During the second stage of the toggle straightening movement the shaft 38 moves from B to A and the slide 40 in which the shaft 38 is journaled moves to the left from its position in FIG. 1 into its position illustrated in FIG. 6, this position of the slide being determined by the engagement of the left end face of the slide with the wedge 96 and the engagement of the wedge with the abutment member 104. During the third and final stage of the toggle straightening movement the shaft 50 advances from D to E and the thrust member 36 advances the mold assembly 20 from its position in FIG. 6 into its mold charging position illustrated in FIG. 2.

The first stage of the toggle straightening movement is variable, depending upon the degree of expansion or contraction of the injection cylinder 14 and the mold assembly 20. The third stage of the straightening movement of the toggle is constant since the normal position of the roll 164 relatively to the injection nozzle 18 is constant. In order that the total toggle straightening movement, which itself is constant, may effect the variable movement CD and the constant movement DE, a variable compensating movement AB of the toggle links is provided, this being the second stage of the toggle operation. The variable movement AB depends upon the adjustment of the wedge 96. The adjustment of the wedge is effected by the partial straightening of the toggle links during the first stage of the toggle operation, the construction of the illustrated toggle organization being such that the first stage of its straightening movement causes an upward movement of the wedge 96 whereby the position A is so determined that the total of AB plus CD is a constant. The movable abutment member 104 against which the wedge 96 is positioned provides a setting up adjustment whereby the extent of the compensating movement AB is varied as necessary to cause a constant movement DE of the extent required to advance the mold assembly from its position in FIG. 6 into mating engagement with the injection nozzle 18.

The modified construction illustrated in FIGS. 11, 12 and 13 differs from the construction hereinbefore described largely in the omission of the abutment roll 164 and the provision of an organization in which the toggle mechanism operates in two stages, a first stage in which the mold assembly is advanced into mating engagement with the injection nozzle and a second stage in which the toggle straightening movement causes a retrograde movement of the toggle mounting slides corresponding to the retrograde movement of the slides 40 illustrated in FIGS. 1 to 6. As in the organization hereinbefore described, the retrograde movement of the slides is arrested by wedge members which are automatically adjusted by mechanism operated by the toggle links during the first stage of their operating movement. This mechanism, which differs in certain respects from the corresponding mechanism illustrated in FIGS. 1 to 6, will now be described. As in the organization hereinbefore described, two wedge members are provided, each having its own linkage connecting it to the toggle mechanism. In the following description only the wedge 200 illustrated in the drawings and the linkage for operating said wedge will be described and it will be understood that this description applies equally well to the wedge and the linkage which are not illustrated. The wedge 200 is positioned between a vertical end face 202 of a slide 204 and an angular edge face 206 of an abutment member 208. The abutment member is secured by two screws 210 to a plate 212 which is adjustably secured to an upstanding side member 214 by a screw 216 extending through a slot 218 formed in the plate. The abutment member 208 is arranged to bear against a vertical surface 220 formed in the side member 214. The linkage connecting the wedge 200 to the toggle mechanism comprises a link 222, one end of which is pivoted to the wedge and the other end to an arm 224 fixed to a disc 226 mounted concentrically on a shaft (not shown) journaled in the side member 214. Fixed in the disc 226 eccentrically of the shaft is a pin 228 on which is pivoted the left end portion of a link 230. Adjustably secured to the link 230 is a headed pin 232 mounted to travel in a longitudinal slot 234 formed in a link 236, the right end portion of which is pivotally mounted on a reduced extension 238 of a shaft 240 which connects a pair of toggle links 242 to a thrust member 244. The link 230 is guided for rectilinear movement by the engagement of its upper edge face with angular edge face 246 formed in the side member 214. The link 230 is urged to the left as seen in FIG. 11 by a spring 248 anchored at its right end to a pin 250 mounted in the link 230 and at its left end to a pin 252 mounted in the side member 214. The arm 224 is urged upwardly by a spring 254, the lower end of which is anchored to a pin 256 mounted in the arm 224 and the upper end of which is anchored to a pin 258 mounted in the side member 214. The link 236 has formed in its left end portion a cam surface 260 which, in the course of the operation of the link engages the arcuate upper end portion of an adjustable plate 262 secured to the arm 224 by two screws 264.

In the operation of the modified linkage illustrated in FIGS. 11, 12 and 13 the wedge 200 is positively moved upwardly by the action of the link 236 against the pin 232 (FIG. 12) and is positively moved downwardly by the action of the cam surface 260 of the link 236 against the arcuate upper edge face of the plate 262 (FIG. 11). The spring 254 assists the upward movement of the wedge, and the spring 248 insures the return of the link 230 and the arm 224 to their respective rest positions illustrated in FIG. 11.

Having thus described my invention, what I claim as new and desire to secure by Letters Patent of the United States is:

1. The combination with a mold assembly, and mold charging means of a toggle comprising a first link and a second link, a carrier for the first link, a thrust member carried by the second link and arranged to translate the mold assembly from a retracted position to a mold charging position, an actuator for straightening the toggle links, yielding means mounted on the mold charging means and arranged to arrest the translation of the mold assembly after a first stage of the straightening movement of the toggle links, an adjustable stop member for positively arresting the carrier upon the completion of a second stage of the straightening movement of the toggle links, and means whereby the actuator adjusts the stop member so that the completion of the straightening of the toggle links during a third stage of their movement completes the translation of the mold assembly into its mold charging position.

2. The combination with a mold assembly and mold charging means of a toggle comprising a first link and a second link, a carrier for the first link, a thrust member carried by the second link and arranged to translate the mold assembly from a retracted position to an intermediate position and from said intermediate position to a mold charging position, an actuator for straightening the toggle links, yielding means of relatively high resistance mounted on the mold charging means and arranged to arrest the translation of the mold assembly at said intermediate position after a first stage of the straightening movement of the toggle links, yielding means of relatively low resistance for holding the carrier against retrograde movement during the first stage of the straightening movement of the toggle links, said actuator operating to continue the straightening movement of the toggle links after the first stage of the straightening movement thereby to impart retrograde movement to the carrier, overcoming said yielding means of low resistance, an adjustable stop member for positively arresting the retrograde movement of the carrier upon the completion of the second stage of the straightening movement of the toggle links, said actuator continuing the straightening movement of the toggle links through a third stage in which the straightening of the toggle links is completed and the mold assembly is advanced from its intermediate position to its mold charging position, overcoming said yielding means of high resistance, and means whereby the actuator adjusts the stop member so that completion of the straightening of the toggle links occurs concomitantly with the arrival of the mold assembly in its mold charging position.

References Cited in the file of this patent

UNITED STATES PATENTS

| | | |
|---|---|---|
| 2,226,408 | Nast | Dec. 24, 1940 |
| 2,298,043 | Dinzl | Oct. 6, 1942 |
| 2,371,547 | Rosenlund et al. | Mar. 13, 1945 |
| 2,407,978 | Eyles | Sept. 24, 1946 |
| 2,496,344 | Hall | Feb. 7, 1950 |
| 2,617,312 | Prentice | Nov. 11, 1952 |
| 2,892,214 | McCarthy | June 30, 1959 |
| 3,027,155 | Patterson | Mar. 27, 1962 |